Aug. 14, 1928.
W. W. EMMONS
1,680,940
SLEEVE TERMINAL BOX FOR ELECTRIC CABLES
Filed Jan. 18, 1923
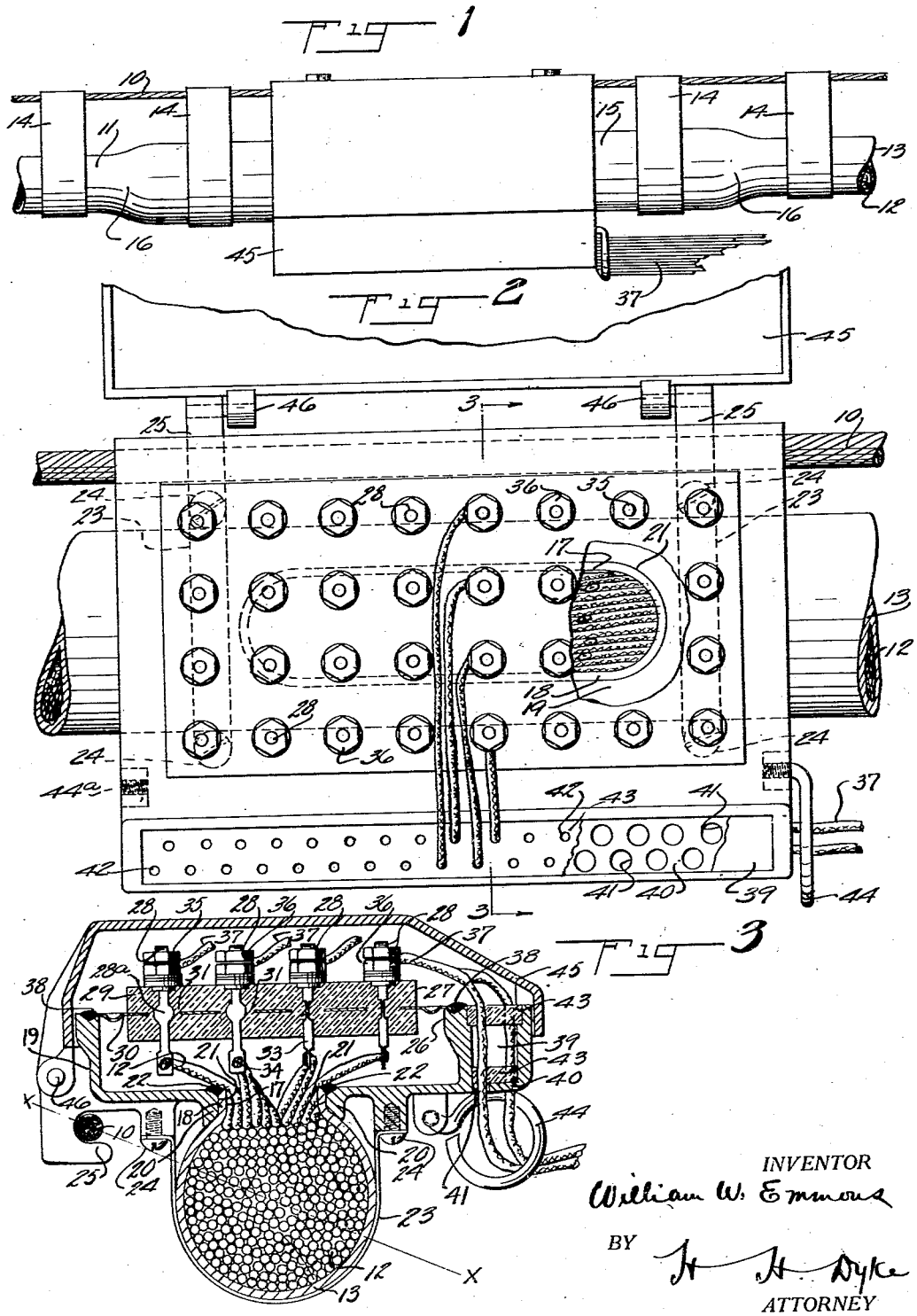
INVENTOR
William W. Emmons
BY
H. H. Dyke
ATTORNEY Patented Aug. 14, 1928.

1,680,940

UNITED STATES PATENT OFFICE.

WILLIAM W. EMMONS, OF NEWARK, NEW JERSEY.

SLEEVE TERMINAL BOX FOR ELECTRIC CABLES.

Application filed January 18, 1923. Serial No. 613,536.

My invention relates to a sleeve terminal box for electric cables.

The terminal box of the present invention is mounted direct on the cable sleeve and supported from the same wire rope that supports the cable. The terminals which are used for termination or distribution of the telephone or other wires contained in the cable are mounted in a face plate, or equivalent member, which is secured by a hermetically tight joint, preferably a soldered joint, or joints, to the cable sleeve and are provided on the exterior of said face plate or the like, with binding posts for direct attachment of the outside wires.

Other features and advantages of my invention will appear in connection with the following description.

In the accompanying drawing, I have illustrated an embodiment of the invention, but it is to be understood that same is for illustration only and for affording an understanding of the invention, and not for limitation thereof.

Fig. 1 is a plan view showing the terminal box in place on a soldered joint of the cable. Fig. 2 is a plan view of the terminal box with the cover open, and with parts broken away. Fig. 3 is a section on line 3—3, Fig. 2, with the cover closed.

Reference numeral 10 is the usual messenger suspension wire rope from which is suspended the cable 11, comprising insulated wires 12 and lead pipe sleeve 13, which is supported from wire rope 10 by suitable suspending members 14 of cord, wire or the like, all of which are in accordance with the usual practice.

While my improved box may be attached direct to the lead pipe cable covering, if desired, it is preferable to cut out a section of the covering and insert an enlarged sleeve section 15 at the region where the terminal box is to be attached. This may readily be done with wiped joints as indicated at 16, 16, making a hermetically tight connection.

The inserted portion 15 when put into place constitutes a part of the continuous cable sleeve or casing enlarged to provide room for the attachment of the extra distributive or terminal wires.

The inserted portion 15 of the cable sleeve is provided with a preferably elongated opening 17 surrounded by a wall 18 which is integral with the sleeve portion 15 and may be made by cutting the sleeve 15 and opening out the material of the sleeve. A face plate or the like containing the necessary terminals may be secured direct to the walls 18 about opening 17, but preferably a face plate larger than opening 17 is used and to accommodate same a box or ring is attached to the walls 18 on sleeve 15 and the face plate is attached to such box or ring, and in this way provision may readily be made to accommodate any desired number of terminals. Said box or ring is also preferably provided with means of suspension from the wire rope 10 and also with a cover for the face plate.

In the form shown, the ring portion 19 of the box is generally rectangular in form and comprises the back wall 20 having the opening 21 therein to receive the wall portion 18 of the sleeve which is soldered to the box ring 19, as indicated at 22, making a tight and permanent joint. For greater security the box ring 19 may be provided with bands or straps 23 passing around sleeve 15 and being secured to sleeve 15, as by means of screws 24, and the box and attached cable are suspended from the wire rope 10, as by means of hooks 25. Straps 23 are designed to carry all the weight and strain, and the soldered joint at the opening in the sleeve is not subjected to strain, but serves merely as a seal.

Ring 19 is initially open on the front, and this opening 26 is adapted to receive the face plate 27, carrying the terminals 28, which may be of any desired number to suit local conditions, a face plate provided with thirty-two terminals being illustrated in the drawing.

The face plate is so constructed as to permit the making of electrical connections to insulated terminals on each face thereof and to enable a tight hermetical joint to be secured. As shown, the face plate 29 is made up of molded insulating material, such as porcelain, with a metal sheet or web 30 molded in place therein and extending outwardly from the edges thereof. The terminals 28 are also preferably molded in place in the insulating material, and provision is made for preventing the terminals from turning or pulling out of the molded insulating material, as, for example, the terminals usually of copper may be provided with a widened and flattened portion 28ª at about the middle of their length, which prevents the terminals from getting loose in the insulating material. When the web or plate 30 is made continuous to extend all the way across or through the insulating material of face plate 29, relatively large holes 31 are provided in the web 30 about the terminals 28. If desired, the sheet metal member 30 may merely extend into the edges of the insulating material to a sufficient extent to be molded tight therein.

The terminals 28 on their inner ends are provided with suitable means for connecting the cable wires or extensions thereof 12, 12. As shown, terminals 28 are flattened at their inner ends as shown at 33 and provided with holes 34 through which the ends of wires 32 may be passed and secured thereto, as by soldering.

The outer ends of terminals 28 are preferably formed into binding posts 35 by being screw-threaded and provided with nuts 36, 36, or other means for securing the outside wires 37 may be resorted to, if desired. After the wires 12 are connected to the terminals 28 on the inner face of face plate 29, the face plate is secured to the box ring or chamber 19 by a fusion joint, as by soldering the margin of web 30 thereto all around the edges thereof, as indicated at 38, thus completely and securely closing up the box.

The lead-out wires 37 are preferably taken out through the back of the box and close to the lower edge thereof as the box is suspended from the cable support. As shown, a trough-like extension 39 is provided along the lower side of box or ring or chamber 19, and the bottom 40 thereof is provided with holes 41 through which wires 37 are passed. These wires 37 after leaving the box may be taped or cabled together in any desired way, and carried down the pole to the exchange or station, sufficient slack being preferably left so that no wear or breakage will result from the swinging of the cable and so that all strains of expansion and contraction are avoided. If desired, the lead-out wires may be passed through holes 42 in a fibre or other insulating plate or plates 43. A ring or the like 44 is provided to hold the lead out wires together where they leave the box. Provision is made for attachment of a second ring 44 at the opposite end of the box, as indicated at 44ª. With this arrangement, the wires may be led out either way as may be most direct and convenient.

A cover 45 is hinged to the member 19 at 46 and when closed serves to cover up the outer side of the face plate and the connections therein. Preferably the cover extends over the lead out wires 37, as well as the cover plate and the terminals or binding posts therein. The cover may be locked shut with a padlock or the like (not shown), as will be readily understood. It will be noted that the line XX, Fig. 3, represents the vertical axis of wire rope and cable when hanging in position. The positions of the box, and the lead out wires from it, are such that water cannot get in to the plate to cause short circuiting, etc., either by beating in of the weather or by capillary action. The wires are brought out at the lowest point and the cover is so placed that any water would have to go uphill to get in.

Modifications and changes may be resorted to within the scope of my claims, without departing from my invention. It will be seen that a terminal box in accordance with my invention has very numerous advantages. Being mounted direct on the cable sleeve and supported from the supporting means provided for the cable sleeve, there is none of the wear, breakage of stub cables and trouble which results when the wires are taken out, as, for example, through a Y-joint on the cable sleeve and carried through a stub cable to a terminal box mounted separately on a pole, building or other support. The joints are all tight, and the cable and wires are hermetically sealed in, avoiding the use of unsatisfactory sealing compounds and completely excluding access of moisture. The electrical connections are permanent and secure and well insulated, and all these and other advantages can be secured, while at the same time a substantial saving in cost is effected. I make use of the terms "soldering" and "soldered" herein as a convenient mode of designating an all-metal joint made by the common operation of soldering or in other equivalent ways.

I claim:

1. A hermetically tight closure for a cable sleeve terminal box comprising a member of insulating material having electrical conducting members permanently embedded therein to extend therethrough, said electrical conducting members having a portion embedded within the insulating material of form adapted for effecting the anchoring thereof in place in the insulating material, and a metallic member permanently embedded in the insulating member to extend from the edges of the insulating member, the extending portion of the metallic member being secured to the terminal box by an hermetic fusion joint.

2. A hermetically tight closure for a cable sleeve terminal box comprising a member of insulating material having electrical conducting members permanently embedded therein to extend therethrough, said members having a widened portion embedded within the insulating material for anchoring them in place therein, and a metallic member permanently embedded in the insulating member to extend from the edges of the insulating member, the extending portion of the metallic member being secured in place in the terminal box by an hermetic soldered joint.

In testimony whereof, I have signed my name hereto.

WILLIAM W. EMMONS.